2,828,206
STABILIZED FAT-SOLUBLE VITAMINS AND METHODS OF MAKING SAME

Adolf Rosenberg, Forest Hills, N. Y.

No Drawing. Application February 24, 1954
Serial No. 412,399

5 Claims. (Cl. 99—2)

This invention relates to feeds or supplements of feeds fortified with the fat-soluble vitamins. More particularly, it is directed to a novel dry composition containing the fat-soluble vitamins in a highly stabilized and physiologically available form.

The provision of means for fortifying feeds with supplements containing the fat-soluble vitamins in assured potencies is a problem which has commanded a vast amount of attention from scientists and technologists. Initially, it was thought sufficient to provide the fat-soluble vitamins for feed supplementation in such form that, until incorporation thereof in the feed, the vitamin content thereof was stabilized so as to withstand destruction or disintegration; and, further, that the feeds containing such supplements should exhibit a retention of the vitamin potency comparable to that of the supplements prior to their incorporation in the feed. However, an even greater and more perplexing problem exists with respect to providing a fat-soluble vitamin supplement that can be included as a component of mineral supplements or mineral concentrates that are now used to provide the necessary or essential trace-mineral supplementations of the basic feed rations.

The first successful solution of the problem of stabilizing fat-soluble vitamins, especially vitamin A, in a supplement that exhibited excellent retention of the vitamin potency was achieved by Melnick (U. S. Patent No. 2,496,634). His solution to the problem resided in providing dry, discrete particles of a high melting fat embodying the fat-soluble vitamins, which particles or granules are distributed in a powdery base, as of soy flour or soy meal, as a protective vehicle. The particles are made by incorporating the fat-soluble vitamins in a molten fatty base, and subsequently manipulating the mass of molten fat with the vitamins distributed uniformly therethrough into the ultimate granules.

However, the Melnick product cannot be incorporated as a component of a mineral concentrate used for the purposes above described. In the presence of the minerals, the Melnick product suffers severe rapid destruction of the vitamins, especially vitamin A. Thus, I have found that when one (1) part of the Melnick product (his example III) is incorporated in one (1) part of the following mineral concentrate:

|  | Grams |
|---|---|
| Manganese sulfate, $MnSO_4.4H_2O$ | 74 |
| Potassium iodide, $KI$ | 6 |
| Ferrous sulfate, $FeSO_4.4H_2O$ | 73 |
| Copper sulfate, $CuSO_4.5H_2O$ | 11 |
| Zinc sulfate, $ZnSO_4.7H_2O$ | 4 |
| Cobalt sulfate, $CoSO_4.H_2O$ | 0.6 |
| Calcium carbonate, q. s. 20 pounds | | to provide a product containing 280 U. S. P. units of vitamin A per gram, the retention of the vitamin A therein is very poor. The mixture shows a loss of from 95 percent to 100 percent of the vitamin A at the half-way stage of the storage period, i. e., 10 days at 45° C., the equivalent of 3 months at room temperature, according to the best judgment of workers in this field of research.

The destruction of the vitamin D also, under those conditions, although not as complete as vitamin A, is, however, severe. Mineral mixtures fortified with the Melnick compositions to an initial potency of 100 U. S. P. units of vitamin D per gram show a destruction of that vitamin of from 50 to 60 percent at the end of ten (10) days' storage at 45° C.

In my studies, vitamin A was determined according to the method of H. O. Schaeffer, J. A. O. A. C., volume 33, page 615 (1950) subject to the U. S. P. XIII biological assay for confirmatory purposes, and vitamin D by the chickbone-ash method, as described in A. O. A. C., sixth edition (1945).

It is to be noted that since mineral supplements are per se indestructible, they are, therefore, stored for much longer periods than other feed supplements prior to use. Suppliers of such supplements to feed manufacturers or to farmers cannot tolerate such excessive losses of the costly vitamins. Hence, prior to my studies as set out in my pending application, Serial No. 365,788, filed July 2, 1953, there was nothing in the art which showed complete supplements that combined both minerals and vitamins with the possibility of guaranteeing vitamin potency thereof. The product described in my said pending application permits the manufacture and distribution of compositions containing minerals and vitamins with guaranteed vitamin potencies. The vitamin stability, particularly of the labile vitamin A in such mixtures is extraordinarily good, provided, as I have now discovered, that the mixture, as such, or the feed to which it will eventually be added, shall contain moisture not in excess of 9 percent. If the moisture exceeds 9 percent, vitamin destruction, particularly loss of vitamin A, occurs. Apparently the destructive influence of minerals on vitamin A in capsulated form is due according to my recent discovery to oxidative forces brought into operation by the presence of moisture.

Prior to my studies, as set forth in my aforesaid pending application, a compromise but very limited solution of the problem of vitamin stability, particularly of vitamin A in a mineral mixture, was hoped for by the expedient of diluting the mineral mixture with quality protein supplements (fish meal, milk protein, meat scrap, etc.). One popular such mixture calls for one part mineral component plus two parts protein, such mineral and protein mixture being supplemented with a stabilized vitamin preparation of Melnick. A rapid turnover (short storage period) of that mixed product is encouraged, but infrequently observed. But even here the vitamin A losses are still large, 60 to 83 percent of the vitamin A being destroyed within the first 10 days at 45° C. or 3 months at ordinary temperatures (initially 86 U. S. P. units per gram). Therefore, such protein-mineral-vitamin supplements must not only be manufactured with huge overages of the labile vitamins, but they also must be consumed within a period of less than 3 months after vitamin fortification—if they are to evidence nutritional value. The above also requires, as I have now discovered, that moisture pick-up by the feed supplement be negligible during storage and shall be less than 9 percent. It is clear that such initial overcharging of a product with the labile vitamins in order to provide an adequate vitamin potency when it is fed to the animals is not only economically wasteful, but results in the pricing thereof at an inordinately high figure. Storage of the product in moisture-proof containers also introduces problems.

Since it is recognized that a deficiency in the ration of one essential nutrient, viz., the vitamin A, interferes with animal growth, reproduction and even survival, despite liberal quantities of the other nutrients, feed manufacturers furnishing the raisers of farm animals with a ration supplement have longed for a solution to their problem of assuring that the vitamin A, E, or D potency of their product will indeed be adequate at the time of feeding, without extra precautions to prevent moisture pick-up.

The failure of the vitamin A in Melnick's compositions to be as stable in feeds and in mineral supplements, as in the compositions themselves, is attributable in part to separation of the vitamin A in the fat granules from the protective influence of the antioxidants in the soy flour base.

The addition of one part of Melnick's composition, the vitamin containing granules in the powdery base, to 99 parts of a feed containing soybean meal in concentrations of 30 percent or less reduces to a large degree the protective influence on the vitamin A of the antioxidants in the Melnick soy flour base. The vitamin A product itself contains only soybean meal or flour around the fat particles embodying the vitamin A. In the feed, on the contrary, there are at least two parts of the other types of feed constituents per one part of the soybean meal which are in contact with the vitamin A component. Melnick has shown that other bases are inferior to soybean meal or soybean flour in protecting the vitamin A granules. This observation has been confirmed by publications from other laboratories (Wall, M. E., and Kelley, E. J., Ind. and Eng. Chem., vol. 43, p. 1146 (1951); Burns, M. J., and Quackenbush, F. W., Ind. and Eng. Chem., vol. 43, p. 1592 (1951)).

In the case of mineral supplements fortified with Melnick's compositions, there is still another and more serious factor that contributes to the oxidative loss of the fat-soluble vitamins. The mineral supplements contain, in plentiful quantity, the so-called trace minerals iron and copper, notorious for their influence in promoting the rapid oxidation of both fats and vitamin A. Even if iron and copper salts are not deliberately included as components of some mineral supplements, the other mineral salts furnish, as contaminants, substantial quantities of these essential elements. A good poultry ration will provide about 200 mg. of iron per kilo of ration (200 parts per million), and about 15 mg. of copper per kilo. In the mineral supplement (concentrate) above described, the iron content is actually about 2000 parts per million and the copper content is about 300 parts per million.

I have found that such high concentrations of iron and copper exert a deleterious effect on the fat and on the vitamin A in Melnick's compositions. I have noted that as little as 3 parts per million of iron or 0.2 per million of copper markedly affects the resistance of even hydrogenated fats to oxidative deterioration and of the vitamins A, D, E, and K contained therein. The observation that the loss of vitamin A parallels peroxide formation in the oil carriers of the vitamin A has been reported by several investigators (Halpern, G. R., Ind. and Eng. Chem., Anal. Ed., vol. 18, p. 621 (1946); Dassow, J. A., and Stansby, M. E., J. Amer. Oil Chem. Soc., vol. 26, p. 475 (1949); Kehren cited by Piskur, M. M., J. Amer. Oil Chem. Soc., vol. 27, p. 211 (1950)). Thus in supplementing mineral mixtures (and even feeds), with the Melnick composition, there results not only a dilution of his soybean meal base, but also the exposure of the fat particles, embodying the fat-soluble vitamins, to the catalytic pro-oxidant effects of iron and copper.

In my aforesaid pending application, products are described and methods of manufacture presented for more effectively stabilizing the fat soluble vitamins, particularly in mineral mixes. The stabilization and protection is shown to be achieved by the creation of dry discrete spheres or beads of small size, i. e., less than 2 mm. in diameter in which the vitamin is a component of a central core that is encased within an outer protective shell. The central core is a solid fat, in which the vitamins, particularly vitamin A, are very stable in the absence of a mineral environment. The outer protective shell is a dry proteinaceous film that has been largely denatured in the process of manufacture. This proteinaceous film serves as a barrier that separates the inner fat core containing the fat soluble vitamins from the mineral mixtures containing pro-oxidant catalysts. The method of manufacture calls for the preparation of a mixture of the melted fat containing the fat-soluble vitamins suspended in an aqueous solution of the proteinaceous material, heating the mixture to a temperature at which the protein would coagulate if the pH were more favorable, homogenizing the mixture to form an oil-in-water emulsion and spray drying the emulsion to obtain vitamin spheres which are substantially dry, free flowing and uniform and similar in structure.

This particular product is exceedingly stable in mineral mixtures provided, as I have now discovered, that the moisture content of such mineral mixtures (and this is usually the case) is less than 9 percent. However, when such vitamin mineral mixtures are incorporated in a feed containing moisture in excess of 9 percent (and this is usually the case) the protective influence of the proteinaceous film is greatly reduced. It is my belief that, in the presence of moisture, certain of the pro-oxidant catalytic metal salts are sufficiently solubilized to penetrate the proteinaceous film and thereby exert their deleterious effect on the stability of the fat soluble vitamins in the central fat core. Other workers in this field have encountered this same problem in their preparation of the vitamin A encapsulated solely in a proteinaceous material such as gelatin or in other vehicles such as gums or pectin. These materials are very hygroscopic and in feed mixtures have exhibited such tremendous losses of vitamin A that they have proved to be ineffective for the purpose intended. In my pending application the use of a denatured protein film has reduced to a large degree the hygroscopicity of the proteinaceous barrier, but not completely. In addition the vitamin A has a second line of defense in being dispersed in a protective fat vehicle which is totally lacking in products employed by others.

It will be noted from the examples set forth in my pending application that the vitamin A used as the most critical test system exhibited excellent retention when incorporated in feed mixtures containing minerals and subjected to an accelerated holding test. This accelerated holding test involved storage of the feed for a period of twenty-one days at 45° C. I have since found that such accelerated holding tests did not exhibit the effect of hygroscopicity that takes place under operating conditions in the field. I have sought for an explanation trying to reconcile the difference in stability results obtained in the laboratory versus those obtained under realistic storage conditions in commercial use. It finally dawned on me that in my accelerated storage tests there was no provision made for measuring the deleterious effect of moisture on vitamin A stability. Indeed storage in the laboratory of the feed containing the stabilized vitamin preparation and added minerals results in a dehydration of the overall mixture undergoing the test with the result that the moisture content is reduced from an initial 10–12 percent down to less than 1 percent at the conclusion of the test. In the use of this product in field tests involving storage for extended periods of time up to six months under conditions of uncontrolled humidity, the said mixtures initially containing from 10 to 12 percent moisture frequently exhibited a moisture increase to a final figure of as much as 15 percent. Under such circumstances vitamin A instability became apparent but to a degree much less than that noted when compositions described by Melnick were employed or those used by others who have relied solely on a barrier for separating the vitamin A from the feed ingredients without regard to hygroscopicity of the barrier material.

It flashed on me, as a result of these experiments, that an absolutely moisture-resistant outer barrier must be employed and that no vitamin A must be present in this outer resistant barrier.

I have discovered a great number of ways in which this type of dry vitamin A product can be made.

Accordingly, it is among the principal objects of this invention to provide a dry free-flowing product containing the fat-soluble vitamins in such a form that they resist deterioration when exposed to air and humidity.

Another object of this invention is to provide a mineral mixture containing a stabilized form of the fat-soluble vitamins in a dry free-flowing form wherein the vitamins are resistant not only to the oxidative deterioration catalyzed by pro-oxidant metal salts but also to the concomitant deleterious effect of moisture pick-up.

A further object of this invention is to provide a feed mixture containing dry free-flowing forms of the fat-soluble vitamins which are stable to oxidative deterioration despite the presence of minerals in the feed containing pro-oxidant metals, and stable against the concomitant deleterious effects of moisture pick-up by the overall feed mixture.

A still further object of this invention is to provide a dry free-flowing form of the fat-soluble vitamins which can be incorporated into a dough-like mass and baked to form biscuits or pellets without dispersing the fat-soluble vitamins throughout the baked products, thereby obtaining a baked product with the vitamin A still retained in discrete stabilized particles.

Still another object of this invention is to provide concentrates for feeding animals on the range where such concentrates are exposed to the elements. Such concentrates, usually consisting of a protein, mineral and vitamin supplement, are made available to animals on the range as a supplement to the natural forage. These concentrates frequently become wet during the period of consumption and up to the present time could never be relied upon as a reliable source for the fat-soluble vitamins, particularly vitamin A.

The fundamental products of the present invention comprise an outer shell or layer or framework of a completely moisture resistant encasing material preferably supplemented with anti-oxidants but containing no fat-soluble vitamin. Inside this outer framework are discrete particles or beadlets, one or more, comprising a dispersion of the fat-soluble vitamins, preferably with added anti-oxidants, in a material which is insoluble in the outer structure. The vehicular material of the inner discrete particles are hygroscopic materials which encapsulate the fat-soluble vitamins in such a way that they cannot be extracted by the substance of the outer structure. I have discovered that, surprisingly, heating a suspension of the discrete particles, granules or beadlets containing the fat-soluble vitamins in molten fat for a prolonged period, for example three hours at 65° C. in preparing the novel fundamental products of this invention, is incapable of solubilizing the fat-soluble vitamins in the molten fat.

The vehicular material employed to manufacture the discrete particles or beadlets (encapsulated by the moisture resistant structure mentioned above) are proteins such as gelatin, soy protein, lactalbumen, etc.; gums such as gum arabic, gum tragacanth, locust bean gum, etc.; carbohydrates and related forms such as sorbitol, starches, pectins, cellulose derivatives such as ethyl cellulose, methyl cellulose and carboxymethylcellulose, and other suitable or appropriate materials.

The material used for the outer shell, layer or structure or casing of the particles in which the tinier vitamin A particles or beadlets are embedded or encapsulated comprise edible fats with a melting point which will preferably remain solid during the anticipated conditions of storage and in transportation. Accordingly, where materials are intended for shipment through warm climates or storage in warm climates, the melting points of the fat will be determined by the anticipated maximal environmental temperatures. For the most part the edible fat used in the external shell, layer or casing of the particles will have a melting point of not less than 45° C. and not above 70° C. Waxes may be employed for the outer casing of the particles with melting points of not less than 45° C. and melting points not greater than 95° C.

I have discovered, when using the high melting edible fats, that good physiological availability of the fat-soluble vitamins is obtained from the products of the present invention in feeding farm birds. Growth of birds subsisting on a suboptimal level of vitamin A in the form of products of this invention is measured against that of birds subsisting on known quantities of vitamin A supplied by an official standard reference material. In addition to this bioassay method, I have relied to a great extent on results of liver storage of vitamin A by birds subsisting on apparent adequate levels of vitamin A. The livers are removed from the birds on completion of the feeding test and the concentration of vitamin A in the liver reflects the quantity of vitamin A that was physiologically available, i. e., absorbable from the digestive tract, in contrast to the chemically-determined vitamin A in the feed prior to consumption.

In feeding farm animals it is desirable to include an emulsifying agent in the outer substance that encases the inner tinier vitamin particles. For this purpose I have preferred to use lecithin and/or a mixture of mono- and diglycerides of the fat-forming fatty acids in concentrations that do not exceed 20 percent of the fat comprising the outer structure. Other emulsifying agents such as the fatty acid esters of sorbitan (Spans) or polyoxyethylene derivatives of such fatty acid esters of sorbitan (Tweens), or polyoxyethylene glycol esters of fatty acids (Myrjs), may also be used.

When waxes such as the mineral oil waxes are used, the above emulsifying agents must be employed regardless of the melting point of the waxes.

Derived forms of the edible fats mentioned above and of the waxes mentioned above, may also be employed provided that they are not hydroscopic.

If the conditions of storage are not too severe, although the effect of moisture is present to some degree, there may be used in place of the outer substance, completely resistant to water, a material that has some solubility in water provided it does not substantially take up and retain that water. Such a material, for example, is typified by glycerol monostearate.

Anti-oxidants may be added to both the outer structure as well as to the inner discrete particles for further protection of the fat-soluble vitamins contained in said particles. Anti-oxidants satisfactory for this purpose are butylated hydroxyanisole, tocopherols, propyl gallate, citric acid and other appropriate and suitable materials. I prefer to add to the outer substance, anti-oxidants which are preferentially fat-soluble, such as butylated hydroxyanisole and/or tocopherols; and to add to the inner discrete particles anti-oxidants which are preferentially water soluble, such as propyl gallate and citric acid. In terms of the final product the anti-oxidants need not generally constitute more than 1.0 percent of the materials comprising either the outer structure or the vehicular component of the inner encased particles.

In making the product of the present invention the inner vitamin-containing particles are made by one method as follows: The fat-soluble vitamins as such, or in an edible fat base, are emulsified with the water-soluble vehicular materials described above to form a fat in water emulsion, that is, the fat is present as discrete particles in a continuous aqueous phase containing therein-dissolved the above-mentioned vehicular materials. This emulsion may be spray dried to give discrete particles which are essentially moisture-free and containing embodied within the center of each particle the fat-soluble vitamins. Drum drying or pan drying with subsequent flaking or granulation may be used to obtain the inner discrete vitamin-containing particles.

Methods of manufacture of such discrete particles are described in my aforesaid pending application as well as by others. The vehicular material need not be first dissolved in water if it melts at a convenient operating temperature to give an oil in vehicle emulsion which may then be spray chilled. (See for example, Patent No. 2,566,410.) In other operations (Patents Nos. 2,218,592 and 2,643,209) the dehydration of the vehicular material is accomplished by washing the discrete particles with a dehydrating solvent and subsequent drying. Any of these processes are satisfactory for making the inner discrete particles of the present invention.

After these tiny discrete particles, usually of a diameter less than 1 mm., are manufactured they are then suspended in the molten edible fat or wax base and the mixture, with good agitation is spray chilled. The particles thus produced by spray chilling will, in general, be characterized by a structure consisting of an outer solidified fatty shell comprising one or perhaps more of the aforedescribed vitamin-containing beadlets. An alternative method of manufacture involves cooling the suspension of the particles to be encased in the molten encasing material to a low enough temperature to permit flaking or pulverizing. An advantage of this method of manufacture is the ability to obtain an end product in which the ratio of discrete beads to outer fat shell is above 30 percent on a weight basis. In the spray chilling operation the ratio of inner discrete particles to the outer fat shell cannot readily be obtained in excess of 25 percent.

The following are some examples of methods of manufacturing the dry, discrete, free-flowing particles containing fat-soluble vitamins in highly stabilized form resistant to the pro-oxidant effects of metals and humidity or moisture.

*Example 1*

100 parts of tiny particles consisting of vitamin A acetate entrapped in gelatine having a vitamin A potency of 500,000 U. S. P. units per gram (being of such size that they provide about 160,000 particles per gram) are thoroughly distributed in 900 parts of molten essentially completely hydrogenated cottonseed oil (melting point about 59° C.).

The thoroughly blended dispersion of the viamin A-containing particles in the molten fat is spray chilled to produce finished particles having a vitamin A potency of 50,000 U. S. P. units per gram. These particles are of the size that they provide about 12,000 particles per gram.

*Example 2*

Pure vitamin A acetate having a vitamin potency of 2,750,000 U. S. P. units per gram is converted into tiny particles using sorbitol as the vehicular material.

The vitamin A acetate (40 parts) is emulsified in a mixture of the molten sorbitol (200 parts) and the polyoxyethylene ether of sorbitan monostearate containing 20 oxyethylene groups per mole (20 parts) and 0.26 part of propyl gallate. The tiny particles produced therefrom (by spray chilling) have a vitamin A potency of approximately 420,000 U. S. P. units per gram.

Then 100 parts of the vitamin A-containing particles produced as above set forth are thoroughly distributed in a molten mixture of 500 parts of essentially completely hydrogenated soy bean oil (melting point 68°–69° C.), 25 parts of lecithin in soy bean oil and 2.5 parts of butylated hydroxy-anisole.

The molten mixture is then spray chilled to produce final particles in which the tiny sorbitol-entrapped vitamin particles are encased in the hydrogenated soy bean oil. The final particles have a vitamin A potency of 67,000 U. S. P. units per gram.

*Example 3*

In one tank 97 parts of essentially completely hydrogenated coconut oil (iodine number of 1.0) having a melting point of 37° C. is heated to about 47° C. To the molten fat are added, 0.02 parts butylated hydroxy-anisole, 0.025 parts of vitamin D crystals [potency 40,000,000 AOAC units (international chick units) per gram] and 3.0 parts of vitamin A palmitate in corn oil (potency 1,110,000 U. S. P. units per gram) and the mixture thoroughly blended.

In another tank, 31 parts of solvent-extracted, non-heat processed soy flour containing about 50 percent protein (nitrogen$\times$6.25) are suspended in 300 parts of warm water at about 40° C. and stirred for a period of fifteen minutes until the soy flour is dissolved. 2 parts of citric acid are then dissolved in this solution.

The contents of the two tanks are mixed (under nitrogen) heated to a temperature of about 65° C. for a short interval (20 minutes) and homogenized. The emulsion is spray dried to produce the tiny particles to be encased.

The tiny particles show a vitamin A potency of 11,000,000 U. S. P units per pound and 3,400,000 AOAC units of vitamin $D_3$ per pound.

These tiny particles (200 parts) are then incorporated in molten fat (800 parts) either essentially completely hydrogenated cottonseed oil or essentially completely hydrogenated soy bean oil; and the dispersion spray chilled to produce the finished particles containing the encasement of the tiny particles.

It will be apparent, therefore, that the fat-soluble vitamin-containing particles of this invention are dry, discrete, free-flowing particles comprising encasements of (A) one or more tiny inner particles comprising fat-soluble vitamin entrapped within a fat-insoluble vehicle, encased in (B) a moisture-resistant substance in which the vehicular material of (A) is insoluble.

The tiny particles (A) may also be made by the methods shown for example, in U. S. Patents Nos. 2,562,840, 2,643,209, or 2,650,895. In U. S. Patent No. 2,566,410 there are described sorbitol particles containing an entrapped oil. That mode of manufacture may be employed to manufacture sorbitol-containing vitamin A by using vitamin A in an ester or other suitable form, essentially pure or in oil solution, as the oleaginous component of the sorbitol particle.

As has been pointed out, in the tiny particles (A) the vehicular component may be protein, carbohydrate, gum, pectin or any other water soluble or water-sensitive material; whereas the encasing substance may be any water-insoluble edible fatty material, or material prepared from edible oils by hydrogenation to melting points of about at least 45° C., as for example, cottonseed, coconut, corn, peanut, etc. Or, there may be used waxes, such as esparto wax or other waxes, or mineral waxes in which the vehicular material of (A) is insoluble. Also, there may be used derived forms of such fats or waxes either completely insoluble in water or sparingly so.

The tiny particles (A) may include preferentially water-soluble anti-oxidants and or emulsifying agents; and the encasing substance may also contain preferentially fat-soluble anti-oxidants and or emulsifying agents.

The fundamental products of this invention exhibit splendid stability of the fat-soluble vitamin, in the presence of pro-oxidant metal compounds and humidity that so severely affect the stability of vitamin A. Such stability is especially noteworthy when the particles are components of high mineral-content feed concentrates, as well as in the feeds fortified therewith and the feed supplements.

It will also be apparent that the particles of this invention may be made by effectuating a thorough distribution of the tiny inner particles (A) in the liquefied substance of (B) wherein (A) is insoluble; and then manipulating the blend of (A) in (B) by any suitable, appropriate or convenient means so as to achieve the ultimate particles comprising (A) encased in (B).

It will be understood that the foregoing description of the invention and the example set forth are merely illustrative of the principles thereof. Accordingly, the appended claims are to be construed as defining the invention within the full spirit and scope thereof.

I claim:

1. Discrete, free flowing particles each comprising at least one inner core of fat-soluble vitamin material, said core being coated with a shell of a fat-insoluble substance selected from the group consisting of protein, gums, carbohydrates and pectin, which is in turn coated with a member of the group consisting of fats and waxes having a melting point between 45° and 95° C.

2. Discrete, free flowing particles each comprising at least one inner core of fat-soluble vitamin material comprising vitamin A, said core being coated with a shell of a fat-insoluble substance selected from the group consisting of protein, gums, carbohydrates and pectin, which is in turn coated with a member of the group consisting of fats and waxes having a melting point between 45° and 95° C.

3. Process of manufacturing discrete, free flowing particles each comprising at least one inner core of fat-soluble vitamin material, which comprises melting a member of the group of fats and waxes having a melting point of 45° to 95° C., dispersing therein fat-insoluble particles, each of said particles comprising at least one inner core of a fat-soluble vitamin material that is coated with a shell of a fat-insoluble substance which is a member of the group consisting of protein, gums, carbohydrates and pectin, chilling said dispersion and dividing the chilled dispersion into discrete, free flowing particles.

4. Process of manufacturing discrete, free flowing particles each comprising at least one inner core of fat-soluble vitamin material, which comprises melting a member of the group of fats and waxes having a melting point of 45° to 95° C., dispersing therein fat-insoluble particles, each of said particles comprising at least one inner core of fat-soluble vitamin material that is coated with a shell of a fat-insoluble substance which is a member of the group consisting of protein, gums, carbohydrates and pectin, and spray cooling said dispersion.

5. Process in accordance with claim 4 wherein the fat soluble vitamin material is vitamin A material.

References Cited in the file of this patent

UNITED STATES PATENTS

| | | |
|---|---|---|
| 2,401,293 | Buxton | June 4, 1946 |
| 2,426,762 | Chanin | Sept. 2, 1947 |
| 2,480,103 | Fux | Aug. 30, 1949 |
| 2,496,634 | Melnick | Feb. 7, 1950 |
| 2,562,840 | Caldwell | July 31, 1951 |
| 2,650,895 | Wallenmeyer et al. | Sept. 1, 1953 |
| 2,702,262 | Bavley et al. | Feb. 15, 1955 |